Sept. 7, 1943.  L. J. IRRGANG  2,328,721
MATERIAL WORKING MACHINE
Filed April 9, 1940
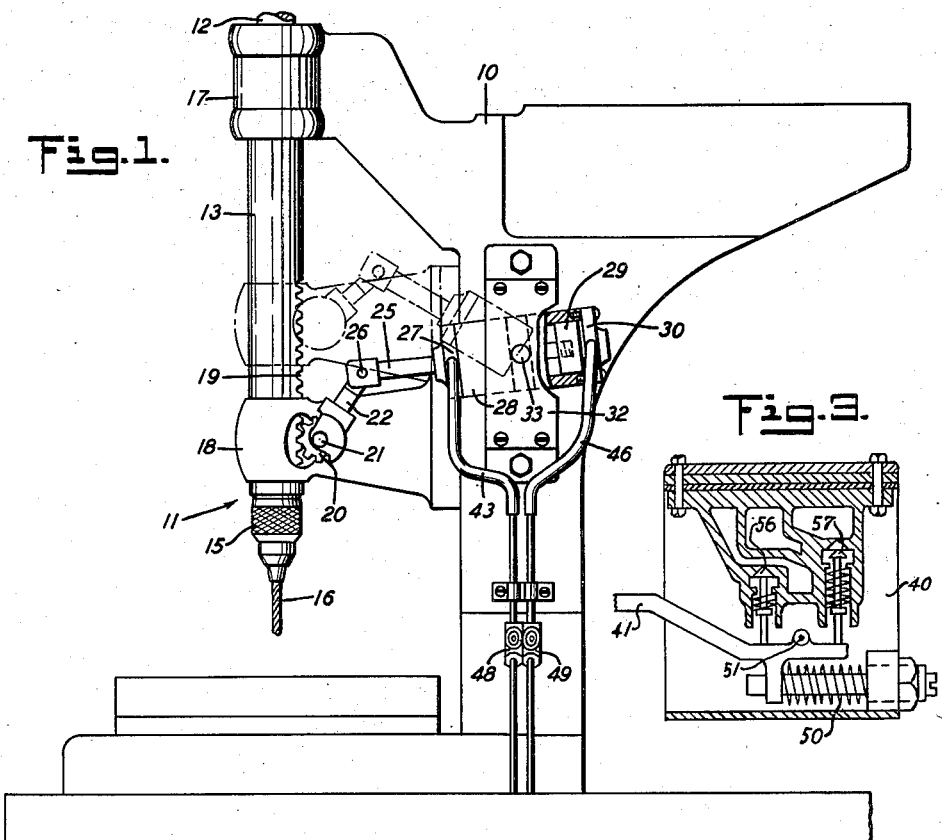
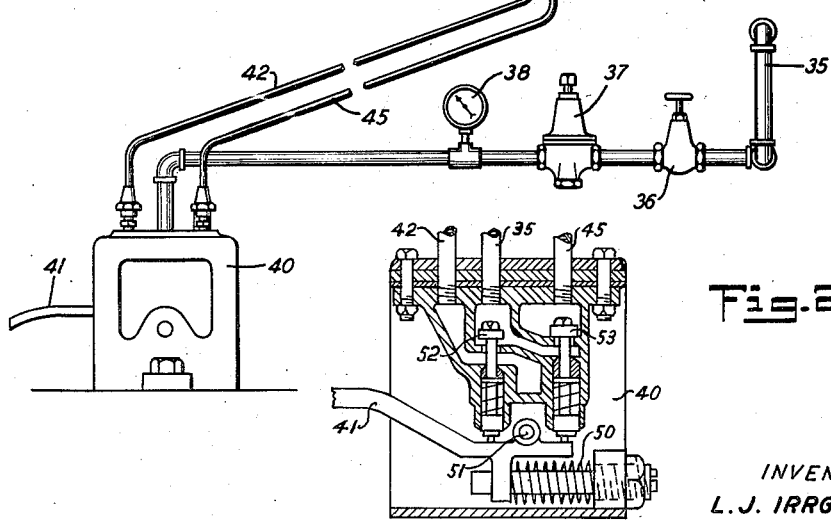
INVENTOR
L. J. IRRGANG
BY
E. R. Nowlan
ATTORNEY Patented Sept. 7, 1943

2,328,721

UNITED STATES PATENT OFFICE 2,328,721

MATERIAL WORKING MACHINE

Louis J. Irrgang, Jersey City, N. J., assignor to Western Electric Company, Incorporated, New York, N. Y., a corporation of New York Application April 9, 1940, Serial No. 328,635

3 Claims. (Cl. 77—32)

This invention relates to material working machines, and more particularly to drill presses and mechanisms for the actuation thereof.

Material working machines of the type necessitating actuation of the control means by hand, such as the raising and lowering of a spindle of a drill press, require but little effort for single operations but when the operations must be repeated frequently throughout a working day this little effort merges into fatigue. Certain operations of such machines require considerable mental as well as physical effort during the single operations to complete the work satisfactorily without breaking tools, by moving the tools, relative to the work at the most efficient speeds, but when this effort has been affected by fatigue it has been found difficult for the operator to maintain the desired efficiency.

An object of the invention is to provide a material working machine having a tool feed which is simple in construction, repeatedly operable manually without fatigue, and accurately dependable for definite and variable speeds.

With this and other objects in view, the invention comprises a material working machine having a unit such as a tool chuck or spindle to be moved, an element actuable to move the unit, and fluid controlling means to actuate the element at desired intervals and at definitely equal, different and variable speeds to move the unit.

Other objects and advantages will be apparent from the following detailed description when considered in view of the accompanying drawing, wherein Fig. 1 is a side elevational view of one type of machine embodying the invention, and Figs. 2 and 3 are vertical sectional views of a control portion of the machine.

Referring now to the drawing, the type of material working machine selected to illustrate the invention is a drill press 10 having a unit indicated generally at 11 which is to be moved relative to work. In the present embodiment the unit 11 consists of a spindle 12 rotatably disposed in a quill 13 and supporting a chuck 15 at the lower end thereof for receiving tools such as drills 16. The upper end of the spindle is operatively connected to any suitable driving means (not shown) to cause rotation thereof. The quill 13 is movably disposed in a stationary bearing bracket 17 and an adjustable bearing bracket 18 and is provided with teeth 19 for interengagement with a pinion 20 rotatably mounted in the bearing bracket 18. The upper end of the quill 13 is provided with a splined interconnection (not shown) with the bearing bracket 17 to allow vertical but not rotatable movement of the quill.

The pinion 20 is fixedly mounted upon a shaft 21, the latter having an arm 22 mounted thereon at the other end thereof. The outer end of the arm 22 is connected to a piston rod 25 through a pivotal connection 26, the piston rod extending through a forward head 27 of a cylinder 28 to a piston 29, where its inner end is secured. The rearward end of the cylinder 28 is closed by a head 30. In order to mount the cylinder to permit vertical adjustment of the bearing bracket 18 without causing variations in the effectiveness of the connection between the piston 29 and the pinion 20, a bracket 32 is rigidly mounted upon the frame of the machine to pivotally support the cylinder 28 at 33.

The fluid controlling means for moving the piston to cause actuation of the arm and movement of the unit 11, namely the spindle 12, the quill 13, the chuck 15 and the tool 16, starts with a main fluid supply line connected with a suitable source to supply a fluid such as air under pressure. A valve 36 is disposed in the main line 35 to cut off the fluid supply if desired. A reducing valve 37 is disposed in the main line to reduce the pressure of the fluid determined by a gage 38 passing to a valve unit 40. The valve unit 40 is a foot actuated valve of the four-way type Figs. 2 and 3, controlled by a spring 50 to urge a treadle 41 or valve lever about its pivot 51 to open a spring pressed valve 52 to thus open communication between the main line 35 and a fluid line 42. The fluid line 42 extends from the valve unit 40 to the head 27, where it communicates with the cylinder 28 on the forward side of the piston through a suitable aperture in the head 27. The upper portion of this fluid line 42 is flexible, as indicated at 43, to allow adjustment of the cylinder 28. When the treadle or valve lever 41 is moved downwardly about its pivot 51 the fluid line 42 is cut off from the main line 35 through the closing of the valve 52 and a fluid line 45 is opened to the main line 35 through the opening of a spring pressed valve 53 to allow the fluid under pressure to pass into the cylinder 28 in back of the piston 29 through an aperture (not shown) in the head 30. The unit 40, as shown in Fig. 3, is provided with spring pressed valves 56 and 57, which may be termed exhaust valves, functioning with their respective valves 52 and 53. It will be apparent, by considering Figs. 2 and 3, that all of the valves are under the control of the treadle 41, the valve 56 being in its closed position when the valve 52 is open and in its open position when the valve 52 is closed. The same function takes place regarding the valves 53 and 57, the latter serving to exhaust the fluid from the line 45 when the valve 53 is closed. With this structure air may be exhausted from either side of the piston during the operation of the piston in either direction. The upper portion of the line 45 is flexible, as at 46, for adjustment of the cylinder. Speed control valves 48 and 49 are disposed in any desired manner (not shown) to vary the pressure in their respective lines to cause the piston to move at definite variable speeds to control the speed of movement of the unit 11 in both directions. Valves 48 and 49 are of a commercially known type, attention being directed to Catalog No. 36-A of the Tomkins-Johnson Co., page 20.

In preparing the apparatus for operation, the reducing valve 37 is adjusted to cause fluid under pressure from the main line 35 to pass to the valve unit 40 at a desired pressure determined by the gage 38. The unit 11 is normally in its upper position, this being caused by the spring 50 and the treadle 41 which normally open the fluid line 42 to the main line 35 through the opening of the valve 52 and effect closing of the fluid line 45 (valve 53) so that the piston 29 will be moved rearwardly, causing actuation of its connecting means, including the piston rod 25, the pivot 26, the arm 22, the shaft 21, and the pinion 20, to move the unit 11 upwardly. When work has been disposed beneath the unit, and the operator is desirous of lowering the unit, the valve lever 41 may be moved downwardly by the foot of the operator, effecting closing of the valve 52 between the main line 35 and the fluid line 42 and opening the valve 53 between the main line and the fluid line 45. When this has taken place the fluid under pressure will pass into the cylinder 28 back of the piston 29, forcing the piston forwardly, and through its connecting means cause downward movement of the unit 11.

The speed of movement of the unit in either direction is controlled through the speed control valves 48 and 49. By the aid of these valves the unit may be moved in both directions at the same rate of speed which is desirable; in some instances, for example, during tapping operations. The unit may also be moved in opposite directions at like variable speeds. By the term "like variable" it is meant that the unit may be moved in one direction at variable speeds and adjustments may be made to move the unit in the opposite direction at the same variable speeds as it is moved in the first mentioned direction. Furthermore, through the aid of the valves 48 and 49 the unit may be moved in opposite directions at desired variable speeds; for example, in drilling operations, at which times the unit may be moved upwardly away from the work at a much faster rate of speed than it should move downwardly toward the work. The valves 48 and 49, therefore, are adjusted to control the desired pressure passing to the piston. If it is desirable to move the unit in both directions at like speeds then the valves 48 and 49 are adjusted to allow fluid at equal pressures to pass to the cylinder. However, if it is desirable to move the unit upwardly at a faster rate of speed than it is moved downwardly the valves 48 and 49 are adjusted to allow fluid under greater pressure to pass to the cylinder 28 in front of the piston than will be allowed to enter the cylinder back of the piston.

With this construction both of the operator's hands are free to handle the work and the entire operation of the apparatus is controlled by the operator's foot, and this merely requires slight pressure downwardly on the valve lever 41 when it is desirable to cause the unit 11 to move downwardly. The mechanism will automatically return to its neutral position when the valve lever 41 is released. Therefore, the element of fatigue has been removed by eliminating the necessity of manual movement of the unit 11 in both directions. Furthermore, the responsibility of determining the right pressure or right speed of movement of the unit to most efficiently complete operations of the tool 16 on the work is taken from the operator and controlled definitely by the valves 48 and 49, so that at each operation on the same type of material the unit 11 will be moved at the same speed and under the same pressure, which is impossible when such operation is dependent entirely upon the judgment of an operator. Thus the breaking of tools is eliminated. Furthermore, it will be apparent that the adjustable bearing bracket 18 may be moved, as indicated in dotted lines, without affecting the operative connection between the unit and its operating means, namely the piston. This is made possible by the pivotal mounting of the cylinder.

The embodiment of the invention herein disclosed is merely illustrative and may be widely modified and departed from in many ways without departing from the spirit and scope of the invention as pointed out in and limited solely by the appended claims.

What is claimed is:

1. A material working machine comprising a movable unit, a guide for the unit adjustably mounted in selected various positions, a piston operatively connected to the unit to cause movement of the unit, a cylinder for the piston, means to support the cylinder for movement into various positions with adjustment of the guide, and means to alternately supply fluid under pressure to the cylinder at opposite sides of the piston to cause reciprocal movement of the unit.

2. A material working machine comprising a movable unit having a toothed portion, a guide for the unit, a pinion interengaging the toothed portion and rotatably supported by the guide, a piston operatively connected to the pinion to cause rotation thereof, a cylinder for the piston, means to pivotally support the cylinder for free movement of the connection between the piston and the pinion, fluid lines to the cylinder at opposite sides of the piston, and alternately operable valves to control a flow of fluid through the fluid lines to cause action of the piston and the pinion to alternately move the unit in opposite directions.

3. A material working machine comprising a movable unit having a toothed portion, a guide for the movement of the unit between spaced positions, means to support the guide for adjustment for variation in the positions the unit is movable, a pinion interengaging the toothed portion and rotatably supported by the guide, a piston operatively connected to the pinion to cause rotation thereof, a cylinder for the piston, means to support the cylinder for variation in position with variation in the position of the guide, fluid lines to the cylinder at opposite sides of the piston, and alternately operable valves to control a flow of fluid through the fluid lines to cause action of the piston and the pinion to alternately move the unit in opposite directions.

LOUIS J. IRRGANG.